(12) United States Patent
Wei

(10) Patent No.: US 9,719,653 B2
(45) Date of Patent: Aug. 1, 2017

(54) LIGHT ASSEMBLY AND METHOD OF USING SAME

(71) Applicant: Wenwen Wei, Yuyao (CN)

(72) Inventor: Wenwen Wei, Yuyao (CN)

( * ) Notice: Subject to any disclaimer, the term of this patent is extended or adjusted under 35 U.S.C. 154(b) by 57 days.

(21) Appl. No.: 14/703,612

(22) Filed: May 4, 2015

(65) Prior Publication Data

US 2016/0327233 A1    Nov. 10, 2016

(51) Int. Cl.
| | |
|---|---|
| *F21L 4/00* | (2006.01) |
| *F21V 3/04* | (2006.01) |
| *F21S 9/03* | (2006.01) |
| *F21V 21/08* | (2006.01) |
| *F21W 131/10* | (2006.01) |
| *F21Y 101/00* | (2016.01) |
| *F21Y 115/10* | (2016.01) |

(52) U.S. Cl.
CPC ............ *F21V 3/0436* (2013.01); *F21S 9/037* (2013.01); *F21V 21/08* (2013.01); *F21W 2131/10* (2013.01); *F21Y 2101/00* (2013.01); *F21Y 2115/10* (2016.08)

(58) Field of Classification Search
CPC ........ F21V 3/0445; F21V 23/003; F21L 4/08; E04H 17/00

USPC ..................... 362/183, 431; 256/1
See application file for complete search history.

(56) References Cited

U.S. PATENT DOCUMENTS

| | | | |
|---|---|---|---|
| 4,951,184 A * | 8/1990 | Makurof ................. | F21V 21/02 362/147 |
| 7,661,837 B1 * | 2/2010 | Pever ...................... | F21S 8/081 256/1 |
| 2005/0247920 A1 * | 11/2005 | Burkart ................... | E04H 17/20 256/1 |
| 2008/0298049 A1 * | 12/2008 | Bennette ............... | F21V 21/002 362/145 |
| 2013/0076269 A1 * | 3/2013 | Shilton .................... | F21L 4/08 315/360 |

* cited by examiner

*Primary Examiner* — Andrew Coughlin
*Assistant Examiner* — Meghan Ulanday
(74) *Attorney, Agent, or Firm* — Ross IP Group, PLLC; Kenneth T. Emanuelson

(57) ABSTRACT

A light assembly is described comprising a housing having an internal surface and an outer surface. The internal surface defines that defines an internal space, and the outer surface has a recessed portion that includes at least one opening into the internal space. The assembly further includes a light emitting diode (LED), a battery in electrical contact with the LED, a solar cell that is at least partially disposed within the recessed portion of the outer surface, and electrical circuitry that enables recharging of the battery. A method of using the light assembly is also described.

19 Claims, 3 Drawing Sheets

LIGHT ASSEMBLY AND METHOD OF USING SAME

BACKGROUND

The present invention relates to a light, and more particularly, to a light which may be attached to a structure, including a structure having vertical members such as balusters of a railing.

The present invention relates generally to providing safety or decorative lighting for railing systems. More specifically, it pertains to solar powered lighting units for simplified attachment to structural members of a railing system to increase safety and enhance aesthetic appeal.

Current emphasis on safety has led to the installation of more numerous railing systems, in particular, along outdoor stairways, and along decks and patios. Handrails along stairways and decorative rails along decks and walkways are now often mandated by local regulations as safety measures. While it has been recognized that the provision of lighting in these settings would enhance both safety and visual appeal, the fact that these railing systems are often placed somewhat remote from a convenient source of electric power, renders the installation of traditional electrically wired lighting systems relatively expensive, and maintenance at best inconvenient.

More recently, outdoor lighting systems have been developed around the use of solar powered lighting units. Such units have been made available for use in connection with marking walkways and providing various aesthetic effects in gardens and the like. The present invention utilizes such currently available lighting technology to provide solar powered lighting units for ready use in connection with lighting along railing systems in promoting safety as well as increased aesthetic appeal.

Thus, there is a need for a light that does not require an electrical outlet or battery replacement, but are self-charging, easy-to-use, small, portable and visually appealing.

SUMMARY

The disclosure is directed to a light assembly and method of using the assembly to illuminate an area in particular, the light assembly comprises a housing having an internal surface and an outer surface. The internal surface defines that defines an internal space and the outer surface has a recessed portion that includes at least one opening into the internal space. The assembly further includes a light emitting diode (LED), a battery in electrical contact with the LED, a solar cell that is at least partially disposed within the recessed portion of the outer surface, and electrical circuitry that enables recharging of the battery. The circuitry optionally enables the LED to emit light after ambient light has ceased.

In one aspect, the light assembly includes circuitry that enables the use of the battery to energize the LED when the ambient light is below a pre-determined level, and/or to enable charging of the battery by the solar cell when the ambient light is above a pre-determined level.

In another aspect, the LED is at least partially disposed within the assembly or contained completely within the assembly.

In some aspects, the housing is at least partially transparent. In some instances made of acrylic or polycarbonate or similar durable synthetic composition.

In further aspects, at least a portion of the outer surface of the housing is substantially planar. In another aspect, the housing is generally spherical with at least two substantially planar regions. In yet another aspect, the recessed portion is disposed within the substantially planar portion.

In other aspects, the housing comprises separable and removably attachable top and bottom sections. In a further aspect, the top and bottom sections each comprise a pair of spaced apart, outwardly extending prongs having ends for connection to a releasable fastener. In another aspect, the spaced apart, outwardly extending prongs extend from a substantially planar region or portion of the housing. At least one of the top and bottom sections is translucent, the top section is translucent, the bottom section is translucent, of both sections are translucent. In some aspects, the top section is not translucent and is opaque. As used herein, "translucent" means transparent or semi-transparent and "opaque" means non-transparent.

In another embodiment, the light assembly further comprises an insulator disposed between the LED and at least a portion of the internal surface.

In yet another embodiment, a method of illuminating an area is described. The method comprises the steps of identifying a structure near an area in need of nighttime illumination, and providing a light assembly comprising a housing having an internal surface and an outer surface. The internal surface defines that defines an internal space and the outer surface has as recessed portion that includes at least one opening into the internal space. The housing has separable and removably attachable top and bottom sections. The top and bottom sections each comprise a pair of spaced apart, outwardly extending prongs having ends for connection to a releasable fastener. The assembly further includes a light emitting diode (LED), a buttery in electrical contact with the LED, a solar cell that is at least partially disposed within the recessed portion of the outer surface, and electrical circuitry that enables recharging of the battery. The circuitry optionally enables the LED to emit light after ambient light has ceased. The method further comprises attaching the light assembly to the structure.

In some aspects of the method the structure is a railing, the part of the structure is a baluster, and/or, the area is man-made structure.

In a further aspect, the step of attaching comprises disposing part of the structure between the spaced apart prongs and affixing the fastener to the prongs.

The use of the word "a" or "an" when used in conjunction. With the term "comprising" in the claims and/or the specification may mean "one," but it is also consistent with the meaning of "one or more," "at least one," and "one or more than one."

The use of the term "or" in the claims is used to meat "and/or" unless explicitly indicated to refer to alternatives only or the alternative are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

BRIEF DESCRIPTION OF THE DRAWINGS

The above and other features of the present invention, its nature and various advantages will be more apparent upon consideration of the following detailed description, taken in conjunction with the accompanying, drawings in which.

DETAILED DESCRIPTION

In view of the challenges associated with cost-efficient and convenient lighting, there exists a need to cheaply and more conveniently illuminate a room that is not dependent on hardwired electrical outlets or battery replacement and that is portable and visually appealing.

Accordingly, the present disclosure provides an light assembly and method of illuminating an area. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Figure 1:
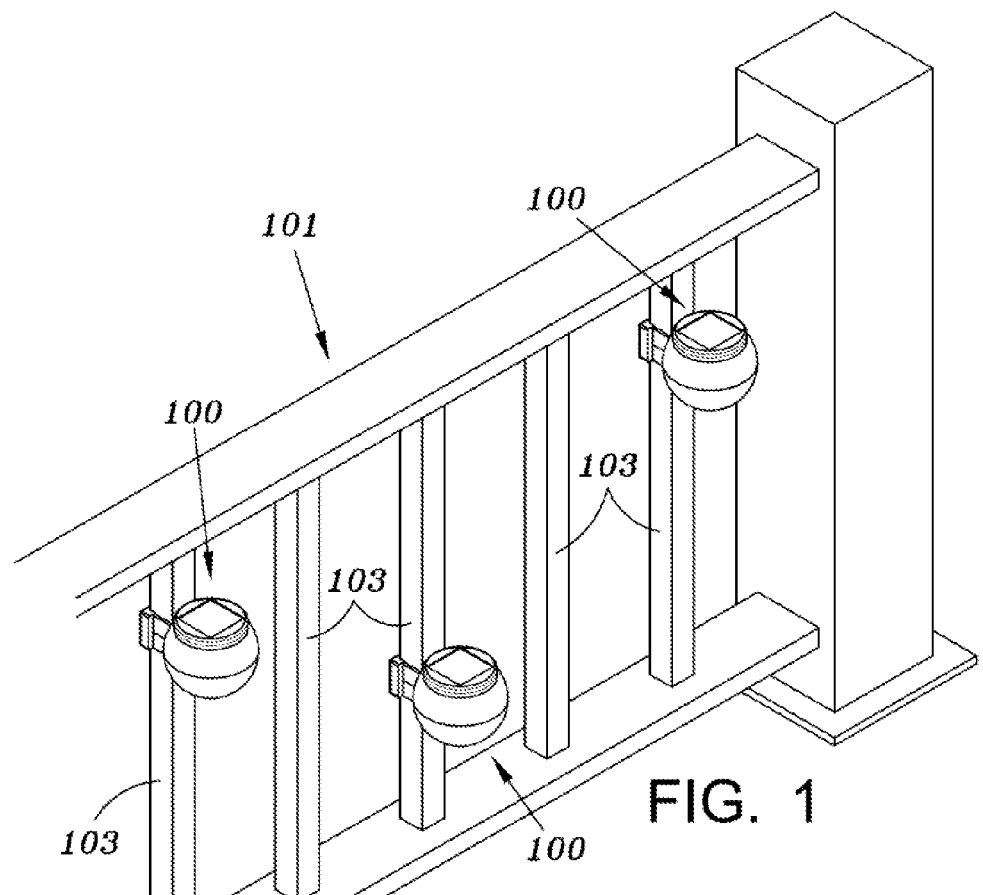
FIG. 1 is a perspective view of a light assembly according to one embodiment of the present invention.

FIG. 1 depicts an illustrative embodiment of light assembly 100 in a plurality, each removably attached to a structure 101. As shown, the structure is a railing and the light assemblies are attached to balusters 103. Other suitable structures may include posts, prongs, rods, and the like.

Figure 2:
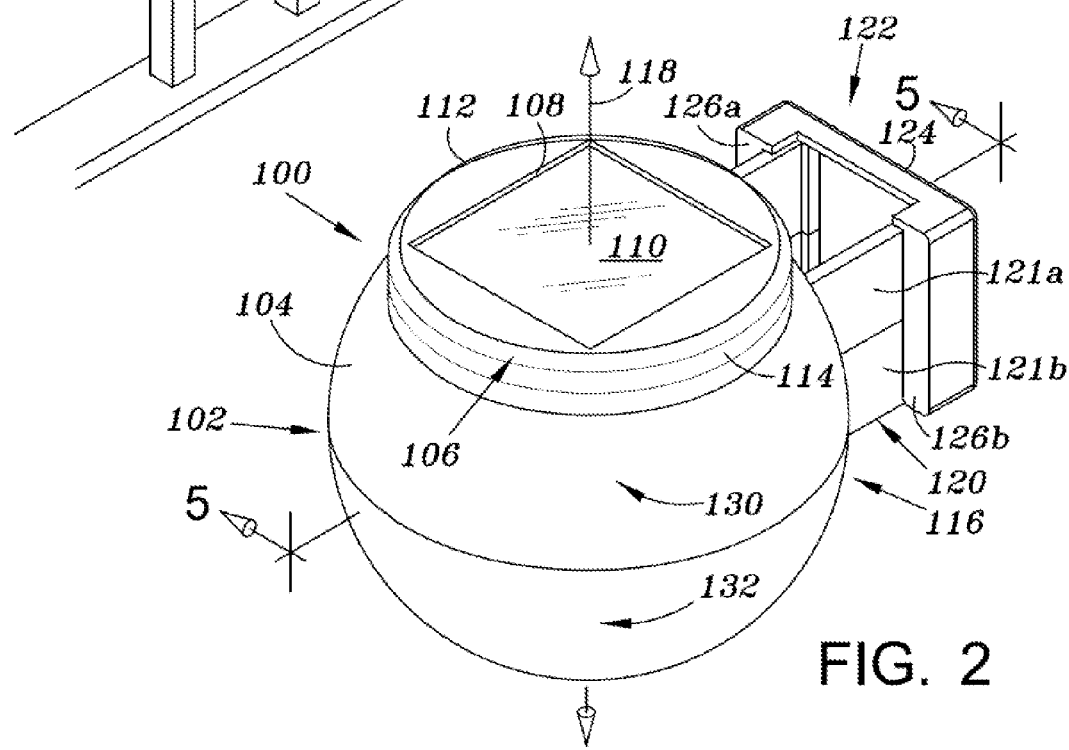
FIG. 2 is a front and side perspective view of the light assembly shown in FIG. 1.
Figure 3:
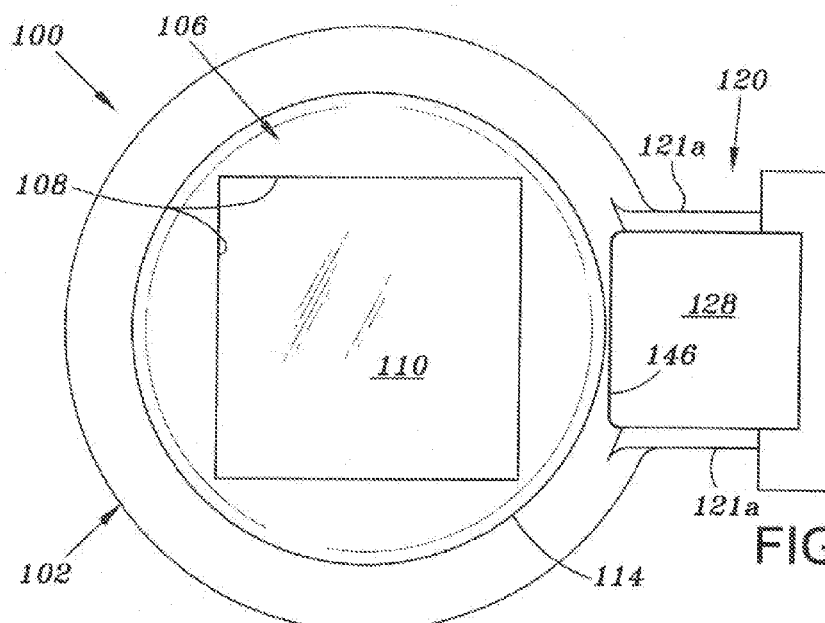
FIG. 3 is a top plan view of the light assembly of FIG. 2.
Figure 4:
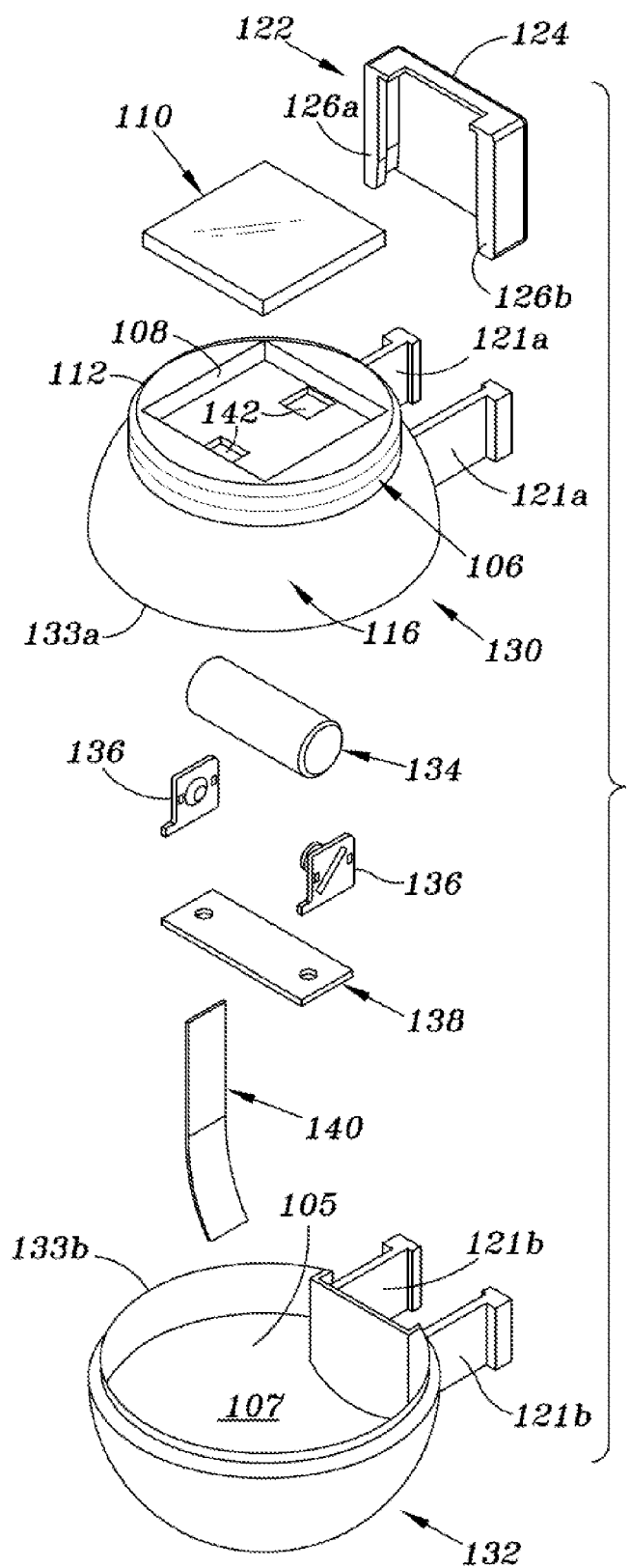
FIG. 4 is a perspective exploded view of the light assembly of FIG. 2 according to one embodiment.

FIGS. 2-4 illustrate light assembly 100 in detail. Light assembly 100 comprises a housing 102 having an outer surface 104. In this embodiment, outer surface 104 of housing 102 has a substantially planar circular top portion 106 that steps down via shoulder 112 into rim or side wall 114 to a substantially spherical body 116. The substantially planar top portion 106 comprises a recessed portion 108. Deposed within recessed portion 108 is solar panel 110. While the recessed portion and the solar panel are shown as square, other shapes may be desirable. As shown in FIG. 3, the diameter of the circular top portion 106 is shorter than the diameter of the substantially spherical body 116, where the diameter of the substantially spherical body is in approximately the same plane as the diameter of the circular top portion and that is transverse to axis 118. Light assembly 100 further comprises a pair of spaced-apart prongs or tabs 120 that extend laterally from housing 102. As shown, the prongs or tabs 120 are depicted as substantially vertical (i.e., parallel to axis 118) and configured for receiving releasable fastener 122. Releasable fastener 122 is substantially U-shaped with a main body section 124 with spaced-apart ends 126a and 126b angled at approximately 90 degrees for slidable engagement over spaced-apart prongs or tabs 120 that may be positioned in a closed position as illustrated, which thereby forms an opening 128 within which structure 101 (e.g., a baluster, post, prong, rod, etc.) may be removably positioned, for example, simply by clip-on attachment. To maintain the light assembly 100 in a substantially fixed position relative to the structure 101 while in use, at least one of the surfaces facing opening 128, such as a surface of prong or tab 120 or the substantially planar back portion 146 of the substantially spherical body (see below) optionally has affixed thereto a resilient compressible material, such as a polymeric sponge or foam, that provides a snug fit or has a high coefficient of friction sufficient to hold the light assembly 100 in place on the structure 101. In a preferred aspect, the light assembly 100 is simply manually attached to the structure without the use of a tool. In another aspect, attachment of the light assembly to the structure does not require the use of a screw, glue, or any other fastener other than releasable fastener 122 and the optional use of the resilient compressible contemplated above.

While the embodiment of the housing illustrated in FIGS. 1 and 2 depict the housing as having at least one portion of the outer surface that is substantially planar, in other embodiments the housing may comprise two or more planar regions, including having an overall box-like shape resembling a square or rectangular cuboid.

In some aspects, the housing is at least translucent and in some applications may be transparent. It may be made of acrylic or polycarbonate or similar durable synthetic composition that permits sufficient passage of light that may be perceived by a human and that illuminates an area.

Further referring to FIGS. 2 and 4, the housing 102 comprises removably attached top and bottom sections 130, 132 having complementary edges 133a, 133b for snap-fit engagement. In one aspect, the top and bottom sections each comprise top and bottom portions of the spaced apart prongs or tabs 120, so that when top and bottom sections are attached the respective top and bottom portions 121a, 121b of the prongs or tabs 120 are in alignment, as shown in FIG. 2. As depicted, the top and bottom sections are approximately equally sized sections but may optionally be of different portions and configurations.

In the embodiment illustrated in FIGS. 1 and 2, where the housing comprises top and bottom sections, at least a portion of one of the sections, preferably the bottom, is translucent. In some aspects, the entire section, either the top, the bottom, or even both are translucent. In some aspects, the top section is not translucent and is opaque. As noted above, as used herein "translucent" means transparent or semi-transparent, and "opaque" means non-transparent.

FIG. 4 is a perspective exploded view of an illustrative embodiment of the light assembly showing in further detail recessed portion 108, releasable fastener 122, and top and bottom sections 130, 132, as well as components comprised within housing 102. In particular, housing 102 comprises rechargeable battery 134, battery contact plates 136, light emitting diode (LED) printed circuit board (PCB) 138, and optional insulating strip 140. As shown, recessed portion 108 includes two openings 142. Also shown in further detail is releasable fastener 122, and in particular a U-shaped cap 124 that in one embodiment where the releasable fastener is positioned via slidable engagement with spaced apart prongs or tabs 120 holds the fastener in place.

In some embodiments, the PCB 138 comprises electrical circuitry that enables the LED to emit light after ambient light falls below a predetermined threshold and to cease light emission after ambient light has increased above a predetermined threshold.

In some embodiments, solar panel 110 is comprised of the group consisting of amorphous monocrystalline, polycrystalline, cadmium telluride, copper indium gallium selenide, and/or a combination thereof.

Figure 5:
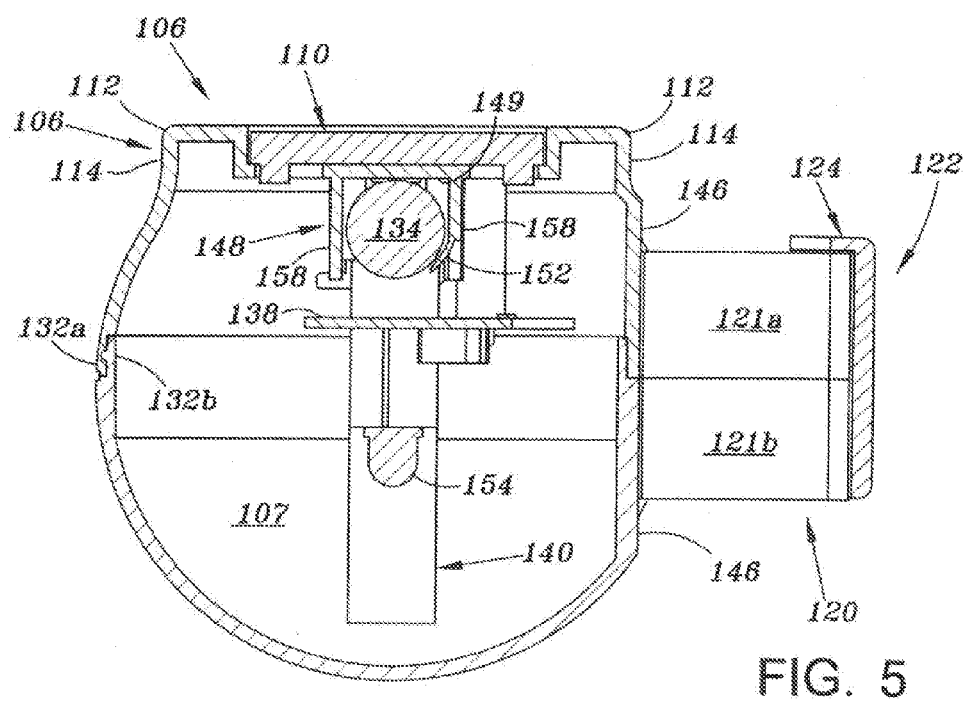
FIG. 5 is a side cross-sectional view of the light assembly of FIG. 2 along line 5-5.

FIG. 5 is a cross-sectional side view of an illustrative embodiment of the light assembly. In particular, FIG. 5 shows that the spaced-apart prongs or tabs 120 extend from a substantially planar back portion 146 of the substantially spherical body. Also shown is a retainer member 148 having a back 149 and two spaced-apart side walls 158. The retainer member preferably has at least one retainer tab 152 extending from an outer edge of at least one retainer member side wall. The back, side walls and retainer tab retain the battery 134 in relatively fixed position within the housing 102. Referring further to FIG. 4, a printed circuit board 138 and LED 154 are shown in greater detail, as is optional insulator 140, which is disposed between the LED 154 and at least a portion of internal surface 105 of housing 102 that defines the interior space 107 in which the battery, LED and LED PCB, battery contacts, and optional insulator are contained.

In some aspects, the optional insulator may include any suitable material, including but not limited materials manufactured from fibrous substances such as cellulosic fibers and derivatives thereof; metal; glass; ceramics; or plastic polymers, such as polypropylene, polyethylene, polyvinylchloride, polystyrene; and/or polyamides.

Insubstantial changes from the claimed subject matter as viewed by a person with ordinary skill in the art, now known or later devised, are expressly contemplated as being equivalently within the scope of this disclosure. Therefore, obvious substitutions now or later known to one with ordinary skill in the art are defined to be within the scope of the defined elements.

The above-described embodiments of the present invention are presented for purposes of illustration and not of limitation.

What is claimed is:

1. A baluster light assembly, comprising:
    a housing having an internal surface that defines an internal space, and having an outer surface, the outer surface having a recessed portion that includes at least one opening into the internal space;
    a light emitting diode (LED);
    a battery in electrical contact with said LED to energize said LED;
    a solar cell that is at least partially disposed within said recessed portion;
    electrical circuitry to enable recharging of the battery and to enable the LED to emit light after ambient light has ceased;
    a pair of space-apart prongs extending outwardly from said housing and having ends for connection to a releasable fastener, wherein said prongs are configured to flank a baluster; and
    a releasable fastener configured to slidably engage the ends of said prongs opposite an outer surface of the housing, wherein when the prongs flank a baluster and the releasable fastener is engaged over the ends of the prongs, the light assembly is held in position against the baluster through contact friction created by tension between the prongs, releasable fastener, and outer surface of the housing.

2. The light assembly of claim 1, including circuitry to enable use of the battery to energize the LED when the ambient light is below a pre-determined level and to enable charging of the battery by the solar cell when the ambient light is above a pre-determined level.

3. The light assembly of claim 1, in which the LED is disposed within the assembly.

4. The light assembly of claim 1, in which the LED is completely contained within the assembly.

5. The light assembly of claim 1, in which the housing is at least partially translucent.

6. The light assembly of claim 1, in which the housing is made of acrylic or polycarbonate.

7. The light assembly of claim 1, wherein at least a portion of the outer surface of the housing is substantially planar.

8. The light assembly of claim 7, wherein the recessed portion is disposed within said substantially planar portion.

9. The light assembly of claim 1, wherein housing comprises separable and removably attachable top and bottom sections.

10. The light assembly of claim 9, wherein said top and bottom sections each comprise top and bottom halves of said spaced apart, outwardly extending prongs.

11. The light assembly of claim 9, wherein said bottom section is translucent.

12. The light assembly of claim 1, wherein said spaced apart, outwardly extending prongs extend from a substantially planar region of the housing.

13. The light assembly of claim 1, wherein the housing is generally spherical with at least two substantially planar regions.

14. The light assembly of claim 1, further comprising an insulator disposed between the LED and at least a portion of the internal surface.

15. A method of illuminating an area, comprising the steps of:
    identifying a structure near an area in need of nighttime illumination;
    providing a light assembly comprising:
        (a) a housing having an internal surface that defines an internal space, and having an outer surface, the outer surface having a recessed portion that includes at least one opening into the internal space; a light emitting diode (LED);
        (b) a battery in electrical contact with said LED to energize said LED;
        (c) a solar cell that is at least partially disposed within said recessed portion;
        (d) electrical circuitry to enable recharging of the battery and to enable the LED to emit light after ambient light has ceased;
        (e) a pair of space-apart prongs extending outwardly from said housing and having ends for connection to a releasable fastener, wherein said prongs are configured to flank said structure; and
        (f) a releasable fastener configured to slidably engage the ends of said prongs opposite an outer surface of the housing, wherein when the prongs flank said structure and the releasable fastener is engaged over the ends of the prongs, the light assembly is held in position against the structure through contact friction created by tension between the prongs, releasable fastener, and outer surface of the housing; and
    attaching the light assembly to the structure.

16. The method of claim 15, wherein the structure is a crib.

17. The method of claim 15, wherein the area is man-made structure.

18. The method of claim 15, wherein the part of the structure is a baluster.

19. The method of claim 15, wherein the housing is at least partially translucent.

* * * * *